April 4, 1944.  J. JANDASEK  2,345,752

TURBO TRANSMISSION

Filed June 16, 1941

INVENTOR.
Joseph Jandasek.
BY
Gray & Smith

Patented Apr. 4, 1944

2,345,752

UNITED STATES PATENT OFFICE 2,345,752

TURBO TRANSMISSION

Joseph Jandasek, Detroit, Mich., assignor to Bendix Aviation Corporation, South Bend, Ind., a corporation of Delaware Application June 16, 1941, Serial No. 398,212

18 Claims. (Cl. 74—189.5)

This invention relates to transmissions and more particularly to a fluid transmission operably connected to mechanical gearing in such a manner that a regenerative power transmitting mechanism is provided.

It has been found that in the operation of power transmitting devices it frequently happens that it is impractical to transmit sufficient power to initiate rotation of a driven member subjected to load. Certain of the disadvantages encountered in the transmission of power can be overcome if means are provided whereby only a portion of the power is transmitted to be exerted on the driven shaft and the remainder of the power is regenerated through a fluid transmission operably connected in the power transmitting mechanism in such a manner that the proportion of power regenerated may be progressively decreased as the speeds of the driving and driven shafts approach each other.

An object of this invention is therefore to provide a renegerative power transmitting device whereby a high degree of power may be transmitted by a comparatively small unit.

Another object of the invention resides in the provision of a regenerative liquid power transmitting device whereby the power transmitted may be cushioned to prevent shocks and provide uniform transmission of power.

Still another object resides in the provision of spaced driving and driven members operably connected through mechanical gearing wherein fluid actuated power transmitting means is associated with the mechanical gearing to cushion the transmission of power and absorb shocks.

Another object is to provide a plurality of speeds forward and a single speed reverse mechanical transmission having a regenerative fluid power transmitting device associated therewith.

A further object resides in the provision of a regenerative fluid actuated transmission associated with a mechanical gear transmission whereby means are provided to render the fluid transmission inoperative to transmit power through the mechanical transmission.

A further object is to provide a fluid power transmitting mechanism and a mechanical power transmitting mechanism coupled to one another manually operable means are provided to isolate the fluid power transmitting mechanism from the mechanical power transmitting mechanism thereby eliminating frictional losses of the fluid actuated device when regeneration of power is unnecessary.

Still a further object is to provide a regenerative transmission having speed responsive means controlled by the speed of the driven shaft to render inoperative the regenerative power transmitting mechanism thereby eliminating transmission losses due to the operation of the power regenerating mechanism.

Another object is to provide a regenerative power transmitting mechanism wherein manually operable means are provided to render inoperative the regenerative power transmitting mechanism when it is desired to transmit power at overdrive or in reverse speeds.

A further object resides in the provision of regenerative power transmitting means whereby a given force exerted by a driving member can be transmitted to be exerted on a driven member at greatly multiplied torque.

Still another object is to provide a combined fluid transmission and mechanical transmitting mechanism whereby greatly increased power can be transmitted per unit size of the device than could be transmitted by a non-regenerative power transmitting mechanism.

Yet another object of this invention is to provide a power transmitting mechanism including a regenerative fluid transmission which may be controlled to regenerate a variable proportion of the power transmitted in proportion to the variation of speed of the driving and driven shafts.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
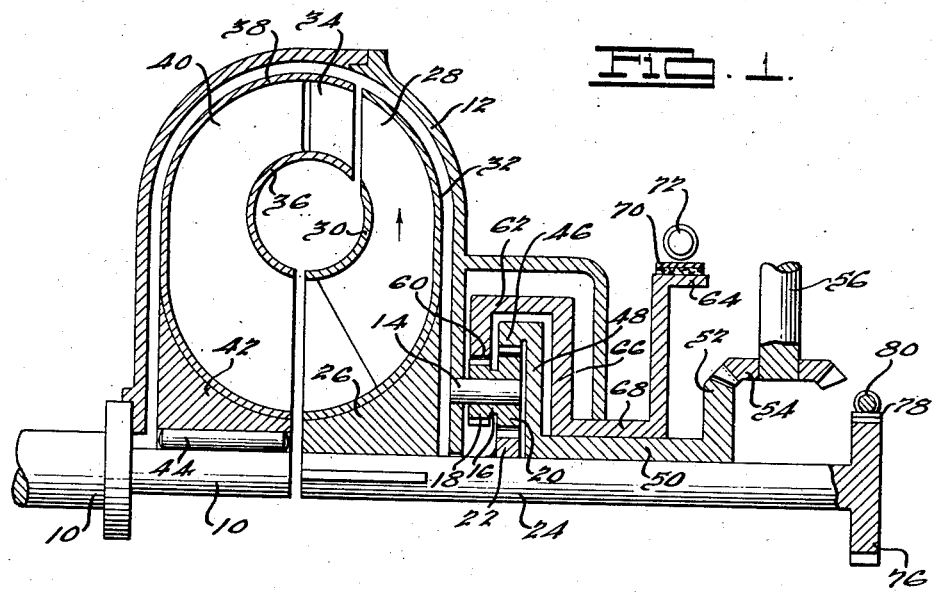
Fig. 1 is a longitudinal sectional view of a device embodying one desirable form of the invention.

Referring now to Fig. 1, it will be observed that a driving shaft 10 is provided with a rotatable housing 12 has thereon a plurality of spaced stub shafts 14. The stub shafts 14 carry spaced pinions 16 having spaced pinion gears 18 and 20 of different diameters. The pinions 20 mesh with a sun gear 22 carried by an intermediate shaft 24 preferably aligned with the driving shaft 10.

The intermediate shaft 24 is provided with an impeller hub member 26 having a plurality of spaced impeller blades 28 interposed between an impeller shroud 30 and an impeller web 32. The impeller is aligned with a turbine member having a plurality of spaced rectifying vanes 34 interposed between a turbine shroud 36 and a turbine web 38 mounted in the rotatable housing 12.

A plurality of main turbine vanes 40 are carried by the turbine shroud 36 and the turbine web 38 and are aligned with the turbine rectifying vanes 34 to receive circulating fluid therefrom. The number of the rectifying vanes 34 employed is considerably more than the number of main vanes whereby the flow of fluid from the impeller to the turbine may be transmitted to the main vanes 40 and the turbine in the proper angular direction to minimize turbulence. The turbine web 38 is carried by a turbine hub 42 concentrically mounted relative to the driving shaft 10.

One-way driving means 44 may be interposed between the turbine hub 42 and the driving shaft 10 to permit the turbine member to impart energy to the driving shaft 10 when the speed of rotation of the turbine member overruns the speed of rotation of the driving shaft 10. The impeller and turbine members cooperate to form a power transmitting fluid circuit operable to transmit power from the rotatable housing member 12 to the driving shaft 10 under certain conditions of operation.

The pinion gears 20 also mesh with a ring gear 46 carried by a flange 48 fixed to a sleeve 50 mounted for rotation thereon the intermediate shaft 24. The sleeve 50 is provided with a bevel gear 52 meshing with another bevel gear 54 fixed to a final driven shaft 56.

The pinion gears 18 mesh with a ring gear 60 carried by a cylinder 62 operably connected to a drum 64 through a flange 66 and a sleeve 68 preferably concentrically mounted relative to the intermediate shaft 24 and the sleeve 50. A brake band 70 actuated by a hydraulic unit 72 may be provided to engage the drum 64 to lock the ring gear 60 against rotation when it is desired to transmit power through the device in reverse direction.

The intermediate shaft 24 is provided with a drum 76 engageable by a brake band 78 actuated by a hydraulic unit 80 to lock the sun gear 22 and impeller against rotation when it is desired to transmit power to the final driven shaft 56 through the mechanical gearing at overdrive speed.

The operation of this device is as follows: Power exerted on the driving shaft 10 rotates the housing 12 and the stub shafts 14. When it is desired to transmit power at normal speed hydraulic units 72 and 80 remain inoperative whereupon the drum 64 operably connected to the ring gear 60 and the intermediate shaft 24 are free to rotate. A portion of the power is transmitted from the pinion gears 20 to the ring gear 46. The remainder of the power is transmitted from the pinion gears 20 to the sun gear 22 operably connected to the shaft 24 to energize the impeller 28.

The pinion gears 20 carried by the stub shafts 14 rotate the sun gear 22 and the ring gear 46. Power transmitted to rotate the ring gear 46 is transmitted through the flange 48, sleeve 50, bevel gears 52 and 54 to rotate the final driven shaft 56. The remainder of the power transmitted by the pinions 20 is exerted on the sun gear 22 to rotate the intermediate shaft 24 and impeller hub 26. Rotation of the impeller hub 26 causes energization of the fluid in the power transmitting fluid circuit by the impeller blades 28. Energy is absorbed from the power transmitting fluid circuit by the rectifying turbine vanes 34 and main turbine vanes 40 and is transmitted through the turbine web 38, turbine hub 42 and one-way driving means 44 to the driving shaft 10.

In the normal operation of a device embodying this invention it is preferable that the unit be designed in such a manner that the proportion of power transmitted to the final driven shaft 56 and the proportion of power regenerated through the fluid transmission be approximately equal. If the final driven shaft 56 is for any reason subjected to increased load the ring gear 46 will slow down the increased load on the final driven shaft and the speed of rotation of the sun gear 22, intermediate shaft 24 and the impeller hub 26 will increase whereupon a progressively increasing proportion of the power will be regenerated through the turbo unit to assist the driving shaft in carrying the load to which the final driven shaft is subjected.

For high speed operation when less torque multiplication is required, the hydraulic unit 80 may be actuated to cause the brake band 78 to engage and hold the drum 76 of the intermediate shaft 24 thereby locking the sun gear 22 and the impeller hub 26 against rotation. The pinion gears 20 will then revolve about the sun gear 22 and drive the ring gear 46 at increased speed. Increased speed of the ring gear 46 results in the transmission of power at greater speed to the final driven shaft 56.

Attention is called to the fact that when the fluid transmission is rendered inoperative because of the locking of the intermediate shaft 24 and impeller hub 36 the turbine hub 42 is free to rotate on the one-way driving means 44 relative to the driving shaft 10. Frictional losses through the turbo unit are thus virtually eliminated.

If it is desired to transmit power in reverse direction, the hydraulic unit 72 may be actuated whereupon the brake band 70 engages the drum 64 to lock the ring gear 60 against rotation. The pinions 18 revolve about the ring gear 60 and due to the fact that the diameters of the pinion gears 20 are greater than the diameters of the pinion gears 18 power will be transmitted to the ring gear 46 and the final driven shaft 56 in reverse direction. When the device is thus operating in reverse direction the sun gear 22 and the intermediate shaft 24 are free to rotate in the forward direction whereupon a portion of the power transmitted can be regenerated through the turbo unit. When the ring gear 60 is locked against rotation the pinions 18 roll around within the ring gear and the sun gear is driven in the forward direction by the pinion gears 20.

Figure 2:
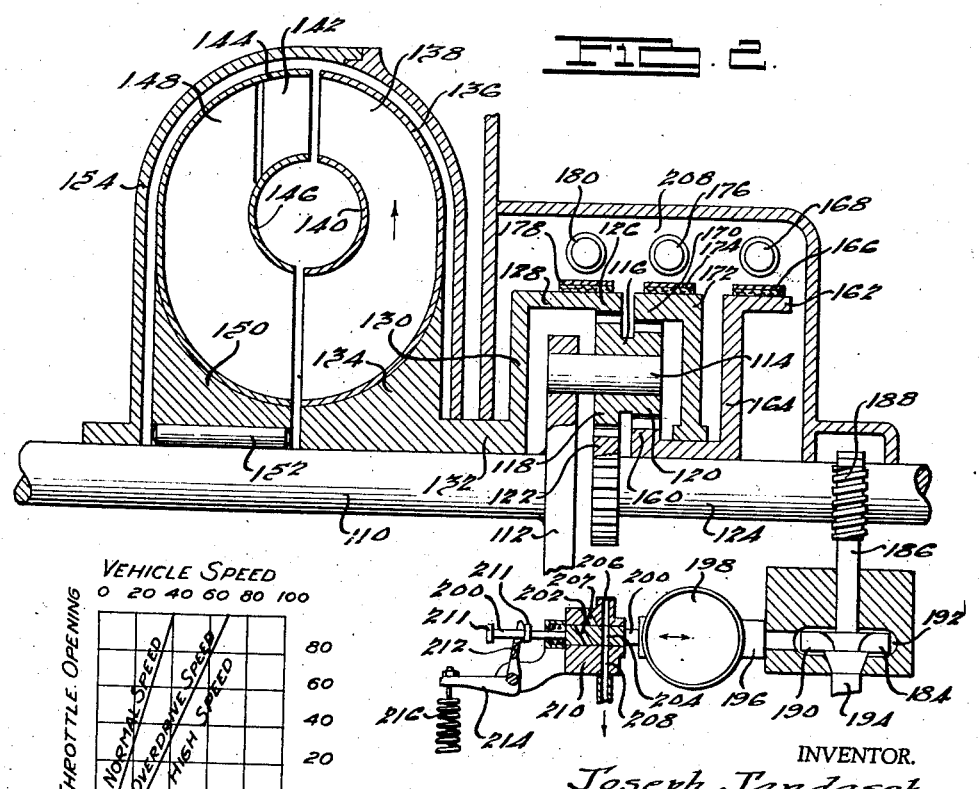
Fig. 2 is a view similar to Fig. 1 showing a modified form of the invention.

Referring now to the embodiment of Fig. 2, it will be observed that a driving shaft 110 is provided with a driving flange 112 having a plurality of spaced stub shafts 114 equipped with pinions 116. The pinions 116 have pinion gears 118 and 120 of different diameters. The pinion gears 118 are adapted to mesh with a sun gear 122 fixed to a driven shaft 124, and with a ring gear 126 carried by a drum 128 connected through a flange 130 and a sleeve 132 to an impeller hub 134.

An impeller hub 134 supports an impeller web 136. The impeller web 136 carries a plurality of spaced impeller blades 138 operably connected to an impeller shroud 140. The impeller blades 138 are aligned with spaced turbine rectifying vanes 142 interposed between a turbine web 144 and a turbine shroud 146. A plurality of spaced main turbine vanes 148 are interposed between the turbine web 144 and shroud 146 and aligned with the rectifying vanes 142. The turbine web 144 is fixed to a turbine hub 150 mounted for rotation on the driving shaft 110 and having one-way driving means 152 interposed therebetween. A housing 154 which may be of the rotatable or non-rotatable type may surround the impeller and turbine units.

The pinions 120 mesh with a sun gear 160 mounted for rotation on the driven shaft 124 and operably connected to a drum 162 through a flange 164. A brake band 166 operated by a hydraulic unit 168 may be provided to lock the drum 162 and sun gear 160 against rotation when it is desired to transmit power in reverse direction.

The pinion gears 120 also mesh with a ring gear 170 on a drum 172 adapted to be engaged by a brake band 174 operated by a hydraulic unit 176 when it is desired to transmit power through the device at high overdrive speed.

The drum 128 carrying the ring gear 126 may be engaged by a brake band 178 operated by a hydraulic unit 180 when it is desired to transmit power through the device at low overdrive speed.

Speed and torque responsive means may be provided to control the operation of the device to selectively operate the hydraulic units 180 and 176 when it is desired to operate the device at low or high overdrive speeds respectively.

One desirable form of such control means comprises a fluid pump 184 having a shaft 186 operably connected through gearing 188 to the driven shaft 124. The shaft 186 is provided with an impeller 190 operating in a chamber 192 having an inlet port 194 and a discharge port 196 communicating with a flexible chamber 198. The flexible chamber 198 is provided with a valve stem 200 having a valve member provided with spaced ports 202 and 204 to selectively interconnect an inlet port 206 or a by-pass port 207 with an outlet port 208 formed in a valve body 210. The outlet port 208 communicates with the hydraulic unit 176 controlling the high overdrive speed, and the inlet port 206 communicates with a suitable source of fluid pressure.

The valve stem 200 is provided with a pair of spaced flanges 211 adapted to be engaged by the bifurcated end portion of an arm 212 of a bell crank 214 to actuate the stem 200. The bell crank 214 may be actuated by a flexible connection 216 operably connected to the speed controlling mechanism of the prime mover such for example as the throttle of an engine.

Figure 3:
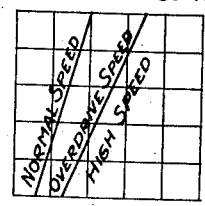
Fig. 3 is a diagram showing the desired power transmitting characteristics of the device embodying the present invention.

In the operation of this device when it is desired to transmit power through the device in the normal speed range as illustrated in the left hand portion of the diagram of Fig. 3, the hydraulic units 180, 176 and 168 are inoperative whereupon power is transmitted from the driving shaft 110 through the driving flange 112 and the stub shafts 114 to the pinion gears 118. The pinion gears 118 engage the sun gear 122 carried by the driven shaft 124 to transmit a portion of the power directly to the driven shaft 124. The pinion gear 118 also engages the ring gear 126 to drive the impeller hub 134 to regenerate a portion of the power through the impeller and turbine units and exert it back on the driving shaft 110 through the turbine hub 150 and one-way driving means 152.

When it is desired to transmit power at overdrive speed within the range indicated by the central portion of the diagram of Fig. 3, the hydraulic unit 180 may be actuated whereupon the brake band 178 engages the drum 128 to restrain the ring gear 126 to lock it and the impeller hub 134 against rotation. The driving shaft 110 then rotates freely within the turbine hub 150 in the one-way driving means 152 and power is transmitted through the mechanical gearing including the stub shafts 114, pinion gears 118 and sun gear 122 carried by the driven shaft 124.

When it is desired to transmit power at still higher overdrive speed within the range illustrated by the right hand portion of the diagram of Fig. 3, the hydraulic unit 176 may be actuated by the speed and torque responsive means operably connected thereto through the port 208 to actuate the brake band 174 to lock the drum 172 and ring gear 170 against rotation. The pinion gears 120 then rotate within the ring gear 170 and power is transmitted through the pinion gears 118 to the sun gear 122 operably connected to the driven shaft 124 at higher speed.

When it is desired to transmit power in reverse the hydraulic unit 168 may be actuated whereupon the brake band 166 locks the brake drum 162 and the sun gear 160 against rotation. The pinion gears 120 roll around the sun gear 160 and due to the variation of the diameters of the pinions 118 and 120 power is transmitted through the pinion gear 118 and sun gear 122 to rotate the driven shaft 124 in reverse direction.

I claim:

1. A power transmitting device comprising a driving shaft, planetary gearing including a plurality of sets of spaced pinion gears rotatable with the driving shaft, a driven shaft, connecting means between one set of said pinion gears and the driven shaft, a member engaging one set of said pinion gears, means to lock said member against rotation to vary the speed ratio of power transmission through the planetary gearing, a second member positioned to be engaged by another set of said spaced pinion gears, a regenerative fluid power transmission comprising an impeller driven by said second member, a turbine aligned with the impeller and cooperating therewith to form a power transmitting fluid circuit, and one-way driving means between the turbine and the driving shaft.

2. In a power transmitting device, a driving shaft, a plurality of sets of spaced pinion gears driven by the driving shaft, a driven shaft, connecting means between one set of said pinion gears and the driven shaft, a regenerative fluid actuated mechanism comprising rotatable impeller and turbine members cooperating to form a power transmitting fluid circuit, connecting means between one set of said pinion gears and the impeller, one-way driving means between the turbine and the driving shaft, a rotatable member engaging another set of said spaced pinion gears, and means to lock said rotatable member against rotation to transmit power through the gearing at a different speed ratio.

3. A power transmitting device comprising a driving shaft, a rotatable housing carried by the driving shaft, planetary gearing carried by and rotatable with the housing, an intermediate shaft having a sun gear positioned to be engaged by the planetary gearing, a driven shaft, a ring gear positioned to be engaged by the planetary gearing and operably connected to the driven shaft, a regenerative turbo unit comprising a fluid energizing impeller operably connected to the intermediate shaft, an energy absorbing turbine aligned with the impeller and concentrically mounted on the driving shaft, one-way driving means between the turbine and the driving shaft, and manually operable means to lock the intermediate shaft sun gear and impeller against rotation whereby power may be transmitted directly from the planetary gearing through said ring gear to the driven shaft.

4. In a power transmitting device, a driving shaft, a driven shaft spaced from the driving shaft, a rotatable housing carried by the driving shaft, planetary gearing including a plurality of spaced double pinion gears carried by and rotatable with the housing, a shaft having a sun gear positioned to be engaged by one set of said spaced pinion gears, a ring gear positioned to be engaged by one set of said spaced pinion gears, connecting means between the ring gear and the driven shaft, an auxiliary ring gear of different diameter than said first mentioned ring gear positioned to be engaged by the other set of said spaced pinion gears of the planetary gearing, manually operable means to lock said auxiliary ring gear against rotation to transmit power at a different speed ratio, a regenerative power transmitting device interposed between said intermediate shaft and the driving shaft comprising a fluid energizing impeller and an energy absorbing turbine, and one-way driving means between the turbine and the driving shaft.

5. In a power transmitting device, a driving shaft, a rotatable housing carried by the driving shaft, planetary gearing comprising a plurality of sets of pinion gears of different diameters carried by and rotatable with the casing, a ring gear positioned to engage one set of said pinion gears, manually operable means to lock said ring gear against rotation, a sun gear positioned to engage one set of said spaced pinion gears, manually operable means to lock the sun gear against rotation, a second ring gear positioned to be engaged by another set of said spaced pinion gears, a driven shaft, connecting means between said second ring gear and the driven shaft, a regenerative fluid power transmitting mechanism comprising an impeller driven by the planetary gearing and an energy absorbing turbine aligned with the impeller and cooperating therewith to form a power transmitting fluid circuit, and one-way driving means between the turbine and the driving shaft.

6. In a power transmitting device, a driving shaft, an intermediate shaft aligned with the driving shaft, a driven shaft projecting at an angle relative to the intermediate shaft, a rotatable housing carried by the driving shaft, planetary gearing including spaced pinion gears carried by and rotatable with the housing, a ring gear positioned to be engaged by a plurality of said pinion gears, connecting means between the ring gear and the driven shaft, a sun gear carried by the intermediate shaft and positioned to be engaged by said pinion gears, a regenerative fluid power transmitting device interposed between the intermediate shaft and the driving shaft and positioned within said housing comprising a fluid energizing impeller driven by the intermediate shaft, an energy absorbing turbine aligned with the impeller and concentrically mounted relative to the driving shaft, and one-way driving means between the turbine and the driving shaft.

7. In a power transmitting device, a driving shaft, a rotatable housing carried by the driving shaft, planetary gearing having a plurality of spaced pinion gears rotatable with the driving shaft and housing, an intermediate shaft having a sun gear positioned to be engaged by a plurality of the pinion gears of the planetary gearing, a driven shaft, a ring gear positioned to be engaged by the pinion gears of the planetary gearing and operably connected to the driven shaft, a regenerative turbo unit comprising a fluid energizing impeller operably connected to the intermediate shaft, an energy absorbing turbine aligned with the impeller and concentrically mounted on the driving shaft, one-way driving means between the turbine and the driving shaft, and manually operable means to lock the intermediate shaft sun gear and impeller against rotation whereby power may be transmitted directly from the planetary gearing through said ring gear to the driven shaft.

8. A power transmitting device comprising a driving shaft, a driven shaft spaced from the driving shaft, double planetary gearing including a plurality of circumferentially spaced pinion gears rotatable with the driving shaft, a sun gear positioned to be engaged by one set of a plurality of said spaced pinion gears, a ring gear positioned to be engaged by one set of said pinion gears, connecting means between the ring gear and the driven shaft, a regenerative power transmitting device interposed between said sun gear and the driving shaft comprising a fluid energizing impeller operably connected to the sun gear and an energy absorbing turbine, and one-way driving means between the turbine and the driving shaft.

9. A power transmitting device comprising a driving shaft, a driven shaft, a rotatable housing carried by the driving shaft, planetary gearing including a plurality of sets of spaced pinion gears rotatable with the driving shaft, a ring gear positioned to be engaged by one set of said pinion gears, connecting means between the ring gear and the driven shaft, a sun gear positioned to be engaged by another set of said pinion gears, a regenerative fluid power transmitting device positioned within said housing comprising a fluid energizing impeller driven by the sun gear, an energy absorbing turbine aligned with the impeller and concentrically mounted relative to the driving shaft, and one-way driving means between the turbine and the driving shaft.

10. In a power transmitting device, a driving shaft, two sets of circumferentially spaced pinion gears driven by the driving shaft, a driven shaft, a sun gear carried by the driven shaft and positioned to engage one set of said spaced pinion gears, a ring gear positioned to engage one set of said spaced pinion gears, another gear positioned to engage one set of said spaced pinion gears, manually operable means to lock said another gear against rotation, an energy transmitting impeller operably connected to said ring gear, and an energy absorbing turbine aligned with the impeller and cooperating therewith to form a power transmitting fluid circuit.

11. A power transmitting device comprising a driving shaft having a plurality of spaced pinion gears of varying diameter rotatable therewith, a driven shaft aligned with the driving shaft, connecting means between the driven shaft and the planetary gearing comprising a sun gear positioned to engage a plurality of said spaced pinion gears of one diameter, a sun gear concentrically mounted on the driven shaft and positioned to engage a plurality of said pinion gears of another diameter, manually operable means to lock said concentrically mounted sun gear against rotation to vary the speed ratio of power transmission, a pair of spaced ring gears positioned to engage pluralities of said spaced pinion gears of different diameters, separate locking means to selectively hold said ring gears against rotation to vary the ratio of power transmission through the device, a regenerative fluid power transmitting device comprising a fluid energizing impeller operably connected to one of said ring gears, an energy absorbing turbine aligned with the impeller and cooperating therewith to form a power transmitting fluid circuit, and one-way driving means between the turbine and the driving shaft.

12. A power transmitting device comprising a driving shaft, a plurality of sets of circumferentially spaced pinion gears driven by the driving shaft, a driven shaft, a sun gear carried by the driven shaft and positioned to engage one of said sets of pinion gears, a ring gear positioned to engage one of said sets of pinion gears, a regenerative energy transmitting turbo unit including an impeller operably connected to said ring gear, an energy absorbing turbine aligned with the impeller and cooperating therewith to form a power transmitting fluid circuit, one-way driving means between the turbine and the driving shaft, manually operable means to lock the ring gear against rotation to render the regenerative turbo unit inoperative and transmit energy at a different gear ratio, another ring gear positioned to engage another set of said spaced pinion gears, and means responsive to the speed of the driven shaft to lock said ring gear against rotation to transmit power at overdrive speed.

13. A power transmitting device comprising a driving shaft, a plurality of spaced double pinion gears driven by the driving shaft, a driven shaft, a sun gear carried by the driven shaft and positioned to engage one set of said pinion gears, a ring gear positioned to engage said one set of pinion gears, a regenerative energy transmitting turbo unit including an impeller operably connected to said ring gear, an energy absorbing turbine aligned with the impeller and cooperating therewith to form a power transmitting fluid circuit, one-way driving means between the turbine and the driving shaft, manually operable means to lock the ring gear against rotation to render the regenerative turbo unit inoperative and transmit energy at a different gear ratio, another sun gear positioned to engage the other set of said double pinion gears, and means to lock said sun gear against rotation to transmit power to rotate the driven shaft in reverse direction.

14. In a power transmitting device, a driving shaft, a final driven shaft projecting at an angle with reference to the driving shaft, an intermediate shaft aligned with the driving shaft, regenerative power transmitting means between the intermediate shaft and driving shaft, and planetary gearing including planet pinions between the driving shaft and the final driven shaft, the intermediate shaft being concentrically mounted in the regenerative power-transmitting means and the planetary gearing.

15. A power transmitting device comprising a driving shaft, a plurality of spaced double pinion gears driven by the driving shaft, a driven shaft, a sun gear carried by the driven shaft and positioned to engage one set of said pinion gears, a ring gear positioned to engage said one set of pinion gears, a regenerative energy transmitting turbo unit including an impeller operably connected to said ring gear, an energy absorbing turbine aligned with the impeller and cooperating therewith to form a power transmitting fluid circuit, one-way driving means between the turbine and the driving shaft, manually operable means to lock the ring gear against rotation to render the regenerative turbo unit inoperative and transmit energy at a different gear ratio, another ring gear positioned to engage the other set of said double pinion gears, and means to lock said ring gear against rotation.

16. A power-transmitting device comprising a driving shaft, a final driven shaft projecting at an angle with reference to the driving shaft, an intermediate shaft aligned with the driving shaft, regenerative power-transmitting means between the intermediate shaft and the driving shaft, planetary gearing including planet pinions between the driving shaft and the final driven shaft, the intermediate shaft being concentrically mounted in the regenerative power-transmitting means and the planetary gearing and projecting therefrom, and brake means to hold the intermediate shaft against rotation to transmit power at different speed ratios.

17. A transmission comprising a driving shaft, a driven shaft, double planetary connecting means betwen the driving and driven shafts, regenerative turbo driving means between one of said planetary connecting means and the driving shaft, gear means engaging the other of said planetary connecting means, and means to lock said gear means to transmit power at different speed ratios.

18. A power-transmitting device comprising a driving shaft, a plurality of double planetary gears driven by the driving shaft, a driven shaft, one member of the double planetary gear being carried by the driven shaft and positioned to engage a set of pinion gears of the double planetary gear, a second member of the double planetary gear being positioned to engage said one set of pinion gears of the double planetary gear, a regenerative energy-transmitting turbo unit including an impeller operably connected to said second member of the double planetary gear, an energy-absorbing turbine aligned with the impeller and cooperating therewith to form a power-transmitting fluid circuit, a third member of the double planetary gear being positioned to engage another set of pinion gears of said double planetary gear, and means to lock said third member against rotation to transmit power at different speed ratios.

JOSEPH JANDASEK.